United States Patent [19]

Heirich et al.

[11] Patent Number: 5,689,574
[45] Date of Patent: *Nov. 18, 1997

[54] INTEGRAL SOUND MODULE FOR A MODULAR MONITOR

[75] Inventors: Douglas L. Heirich, Redwood City; Roy Riccomini, Campbell, both of Calif.

[73] Assignee: Apple Computer, Inc., Cupertino, Calif.

[*] Notice: The term of this patent shall not extend beyond the expiration date of Pat. No. 5,587,876.

[21] Appl. No.: 412,704

[22] Filed: Mar. 29, 1995

[51] Int. Cl.⁶ .................................................. H04R 25/00
[52] U.S. Cl. .................... 381/158; 381/24; 381/87; 381/88; 381/159
[58] Field of Search .......................... 381/24, 159, 87, 381/88, 89, 153, 155, 158

[56] References Cited

U.S. PATENT DOCUMENTS

4,152,544  5/1979  Sanpei et al. .
4,645,153  2/1987  Granzow et al. .
5,400,408  3/1995  Lundgren et al. ................... 381/159
5,519,572  5/1996  Luo ........................................ 381/87
5,587,876  12/1996 O'Brien et al. .

*Primary Examiner*—Curtis Kuntz
*Assistant Examiner*—Duc Nguyen
*Attorney, Agent, or Firm*—Fenwick & West LLP

[57] ABSTRACT

An integral sound module provides a novel isolation system between the display unit and the audio unit. The display unit preferably includes a cathoderay tube (CRT) and associated electronics mounted within a monitor housing. The audio unit comprises a tray member, a cover, and a pair of speakers. The speakers are mounted to the cover by the second isolation means. The first isolation means is disposed on top of the cover of the audio unit to provide for coupling with the bottom of the display unit. The first and second isolation means prevent vibrations from the speakers from being transmitted through the cover and audio unit to the display unit. The cover is also mounted on the tray member to form an audio chamber. The edges of the cover and tray member mate using joints with narrow channels to provide an audio seal that resists the movement of air from within the audio chamber to outside the chamber. The audio seal provided by the joints improves the audio performance of the speakers.

18 Claims, 6 Drawing Sheets

INTEGRAL SOUND MODULE FOR A MODULAR MONITOR

CROSS-REFERENCE TO RELATED APPLICATIONS

This application relates to U.S. Pat. No. 5,587,876, entitled "MODULAR MONITOR ARCHITECTURE", filed Mar. 30, 1995, which is incorporated herein by reference.

BACKGROUND OF THE INVENTION

1. Field of the Invention

The present invention relates generally to display devices for computers, and more particularly, to a sound module that is formed as an integral part of a monitor. Still more particularly, the present invention relates to a sound module for audio output that is isolated from the display device to prevent sound energy from adversely affecting the display device.

2. Description of the Background Art

The use of computers generally and the diversity of applications for which they may be used has increased greatly in recent years. One particular area of increased use for computers has been multimedia. Multimedia provides that computers no longer provide only visual output by displaying images on an display device, but also requires that the computers include an audio output device for producing the sounds associate with many programs that may operate on a computer. One common approach to satisfying the need for such multimedia output devices has been to construct integrated output devices that include both a conventional computer monitor as well as speakers.

One particular problem in constructing integrated output devices that provide both visual and audio output is making sure that the operation of the audio output device does not interfere with the operation of the visual output device, and vice versa. Computer monitors typically include a cathode-ray tube (CRT) to provide the visual output. Such CRTs include an electron gun that propels electrons toward a phosphor screen to produce dots or pixels of illumination when the electrons hit the phosphor screen. Disposed between the gun and the phosphor screen is a mask that helps to channel the electrons and sharpen the image by defining areas on the phosphor screen for each pixel. In CRTs that use Trinitron technology, the mask is replaced by a series of very thin vertical wires spaced across the screen. However, the mask, and especially the vertical wires, can vibrate and are very easily excited by sound and other vibration forces. When the mask or vertical wires vibrate some of the electrons that would under normal circumstances generate the display pixels are masked (i.e., do not hit the phosphor screen because they are defected by the mask), while other electrons that would normally be masked to make the pixels form a shaper image are allowed to pass to the phosphor screen because mask has moved due to vibration. The overall effect of the vibration mask or excitation of vertical wires is that images displayed by the monitor lose their clarity, are reduced in brightness, and the overall monitor performance is degraded. Thus, there is a need for a system that can eliminate the effects of the sound output device on the visual output device.

Because of the effects of such audio systems on display performance, audio systems are typically separate components from the display device. For example, there are variety of audio systems that provide speakers detached and separate from the display device. These systems suffer from the deficiency of not being integrated systems and not positioning the audio systems (e.g., the speakers) with the optimum positioning proximate the display device. Even for the few systems that do provide an integrated design, they must include costly and often not fully effective isolation systems to prevent the audio and visual systems for affecting each other. Thus, there continues to be a need for a system that effectively isolates the audio and visual systems with minimal cost.

Another problem in constructing integrated output devices that provide both visual and audio output is forming an audio chamber with a good audio seal (close to air tight). The audio chamber must be well sealed, otherwise the audio performance of the speakers is degraded. Monitor housing technology does not provided good audio seals between housing components since such seals are not required for the operation nor do they improve performance of the monitor. Thus, there is need for a means of forming an effective audio chamber that can be used with monitor housing technology to create an integrated device.

Thus, there is a need for an integrated audio unit and visual unit that eliminate the above problems of the prior art.

SUMMARY OF THE INVENTION

The present invention is an integral sound module for a modular monitor providing a novel isolation system between the display unit and the audio unit. The display unit preferably includes a cathode-ray tube (CRT) and associated electronics mounted within a monitor housing. The bottom of the monitor housing is adapted for mounting on top of the audio unit using a first isolation means. The audio unit comprises a tray member, a cover, and a pair of speakers. The speakers are mounted to the cover by the second isolation means. The first isolation means is disposed on top of the cover of the audio unit to provide for coupling with the bottom of the display unit. The first and second isolation means reduce vibrations from the speakers from being transmitted through the cover of the audio unit to the display unit. The use of the second isolation means prevents the cover and tray member from amplifying the vibrations from the speakers due to the resonant responses of the cover and tray member. The use of two stages of isolation means effectively dampens or eliminates vibrations from being transmitted to and from the cover of the audio unit. The present invention also improves the audio performance of the speakers by forming an air tight chamber behind the speakers. The cover is mounted on the tray member to form an audio chamber. The edges of the cover and tray member mate using novel joints to provide an audio seal that resists the movement of air from within the audio chamber to outside the chamber. The effective audio seal improves the audio performance of the speakers.

DETAILED DESCRIPTION OF THE PREFERRED EMBODIMENTS

Figure 1:
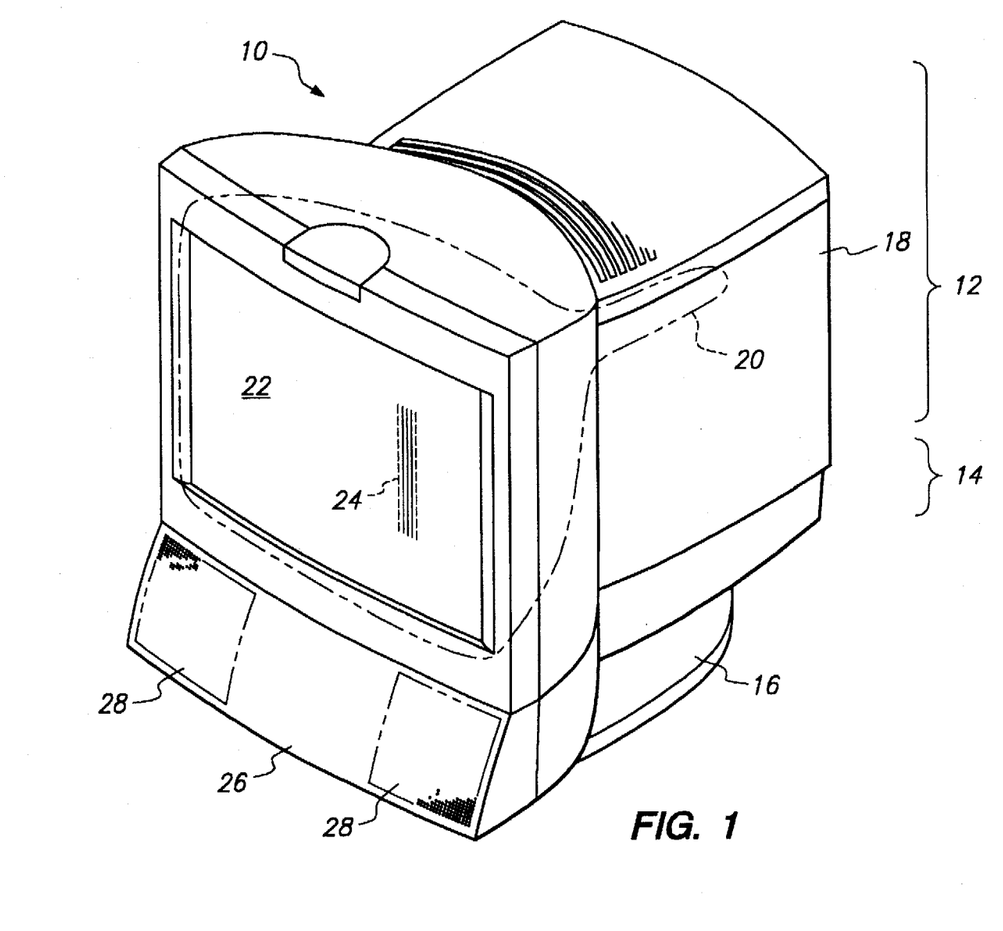
FIG. 1 is a perspective view of a preferred embodiment of an integral audio and visual output system including an integral audio unit of the present invention.

FIG. 1 shows a perspective view of a preferred embodiment of an integral audio and visual output system 10 constructed in accordance with the present invention. The integral audio and visual output system 10 preferably comprises a display unit 12, an audio unit 14 and a base 16. The display unit 12 is mounted to and rests upon the audio unit 14. Together, the display unit 12 and the audio unit 14 form an integrated device that provides both visual output and audio output. The audio unit 14, with the display unit 12 mounted thereon, is in turn mounted upon the base 16 is a conventional manner such that the display unit 12 and the audio unit 14 will pivot, rotate and tilt atop the base 16. Those skilled in the art will realize that there are variety of configurations that may be used to attach the base 16 to the audio unit 14 to provide this mobility.

As best shown in FIG. 1, the display unit 12 preferably comprises a housing 18, associated electronics (not shown), and a cathode-ray tube (CRT) 20 having a visible screen 22. The housing 18 is preferably formed of a generally rectangular bucket portion and lid, a concave mid-section and bezel. These portions of the housing 18 are attached together in a conventional manner such as using screws, pins or plastic fasteners formed as part of each portion. In the preferred embodiment, the housing 18 is constructed of hard plastic such as through an injection molding process. The shape of the housing 18 is generally adapted to surround and enclose the CRT 20. Thus, those skilled in the art will understand that there are a variety of housing shapes that may be used with the present invention and that the housing 18 may also define various apertures for control buttons, cabling and ventilation. The CRT 20 is a conventional type and may take various sizes such as 14', 17'or 20'. The position of the CRT 20 in the housing 18 is shown by phantom lines in FIG. 1 and the screen 22 of the CRT 20 is visible through a window defined by the bezel of the housing 18. The associated electronics are mounted in the housing 18 along with the CRT 20. FIG. 1 also shows a portion of the mask or vertical wires 24 with phantom lines on the screen 22 of the CRT 20 for illustration purposes.

The audio unit 14 preferably includes a front panel 26, a tray member 30, a cover 32 and a pair of speakers 34, 36. The front panel 26 is mounted on the front of the tray member 30 and the cover 32 as shown in FIG. 1. The front panel 26 defines a pair of rectangular apertures, one proximate each side. The apertures are covered by a perforated screen 28 that allows sound to be output through the front panel 26 while protecting speakers 34, 36 from contact with foreign objects.

Figure 2:
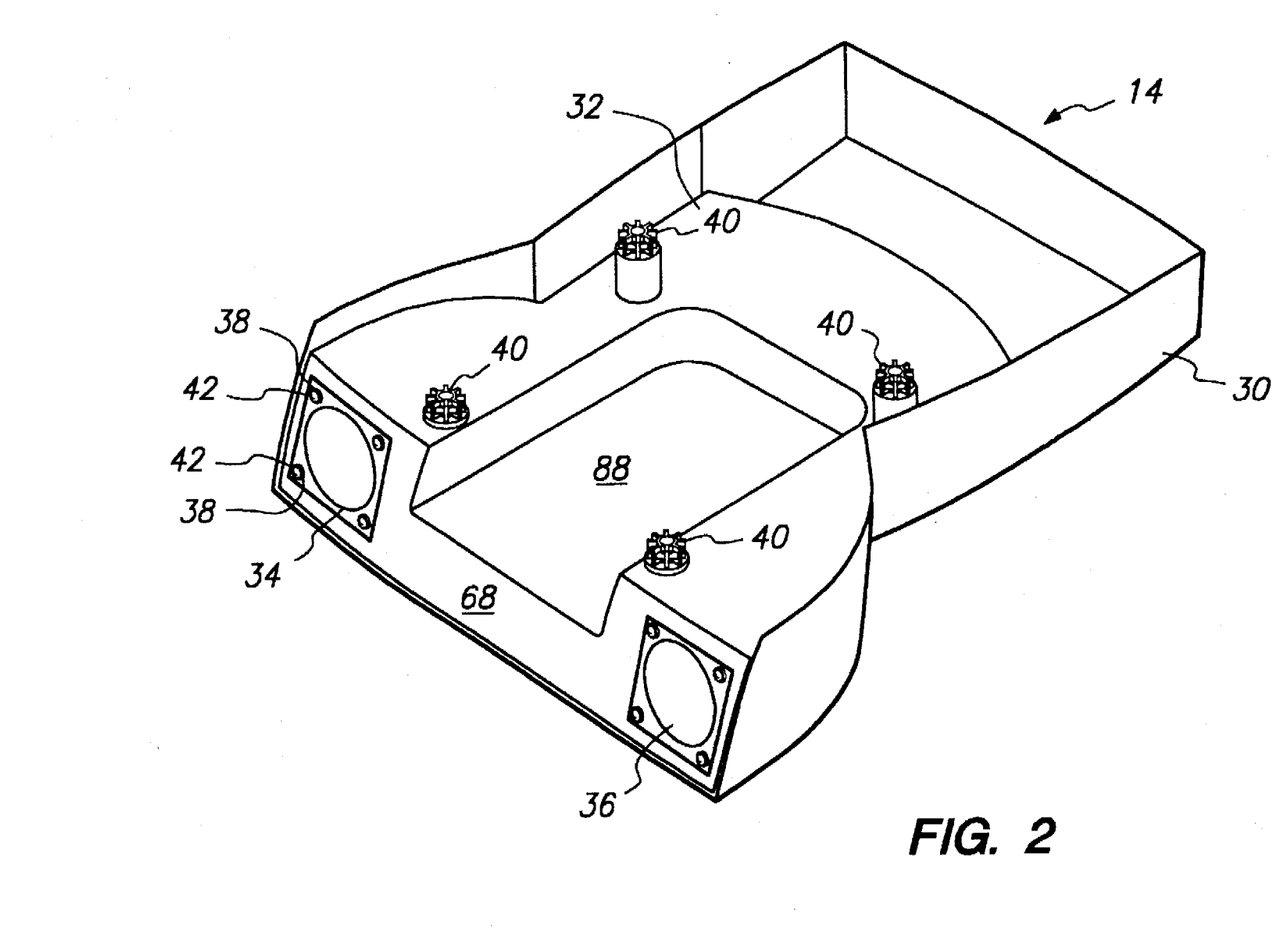
FIG. 2 is a perspective view of the preferred embodiment of the audio unit of the present invention.

Referring also to FIG. 2, a preferred embodiment for the audio unit 14 is shown in more detail. FIG. 2 shows a perspective view of the audio unit 14 and the relative positioning of the tray member 30, cover 32 and speakers 34, 36. The tray member 30 forms the bottom, rear and sides of the audio unit 14 and is attached to the base 16. The cover 32 has a generally planar shape and is positioned over the front and middle potions of the tray member 30 to form an audio chamber there between. Like the housing 18, the cover 32 and tray member 30 are preferably constructed of hard plastic using an injection molding process. The cover 32 includes a front wall 68 and rear wall that extend downward to enclose the area between the cover 32 and the tray member 30. The front wall 68 also defines a pair of openings 90 proximate each side in which a speaker 34, 36 can be mounted. The speakers 34, 36 are mounted in respective openings using a plurality of fastening means 42 and second isolation means 38. Along the longitudinal axis of the cover 32, a channel 88 extends from the front wall 68 of the cover 32 rearward approximately two thirds the length of the cover 32. The channel 88 is particularly advantageous because in addition to enhancing the structural integrity of the cover 32, the vertical walls of the channel 88 provide additional control of resonances so that the vibrations from the speakers 34, 36 are not amplified. The channel 88 interacting together with the second isolation means 38 is especially effective at dampening much of the vibrations before they reach the display unit 12. Along the sides of the channel 88, near its front and rear, a plurality of first isolation means 40 are mounted on top of the cover 32. The first isolation means 40 provides for mounting of the audio unit 14 to the display unit 12.

Figure 3:
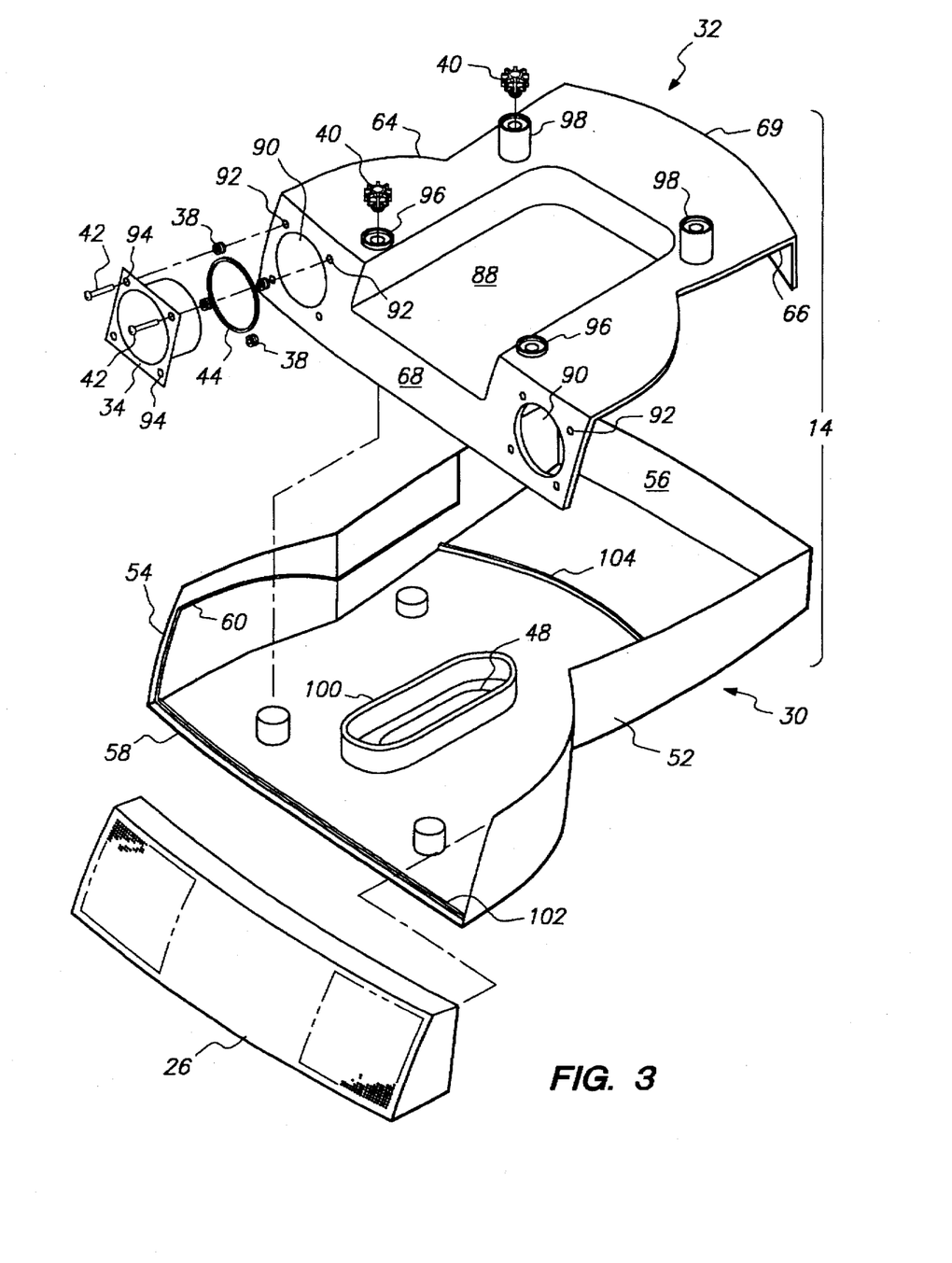
FIG. 3 is an exploded perspective view of the preferred embodiment of the audio unit of the present invention.

Referring also now to FIG. 3, an exploded view of the audio unit 14 is shown. FIG. 3 shows the attachment of the left speaker 34 to the cover 32 in more detail. The right speaker 36 is attached to the cover 32 in a similar fashion as that described below. As has been noted above, the cover 32 defines opening 90 on the left side of the front 68 for receiving the speaker 34. About the periphery of the opening 90, a series of holes 92 are provided for receiving and securing the fastening means 42. In the preferred embodiment, the speakers 34, 36 have a generally cone shape with a mounting flange near the base of the generally cone shape. The flange has a generally square shape and defines a plurality of holes 94 corresponding in number and position to the holes 92 of the cover 32. The holes 94 have a larger diameter that the holes 92 of the cover 32, and are sized to receive and hold the second isolation means 38.

Figure 10:
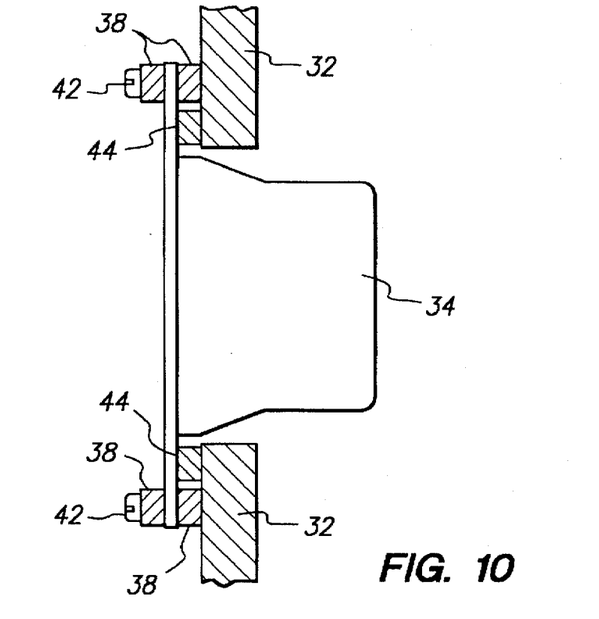
FIG. 10 is a partial cross-sectional view of a portion of the audio unit proximate a speaker and taken along line 10—10 of FIG. 4.

The second isolation means 38 is preferably a grommet made of elastomeric material with very good vibration absorbing characteristics such as EAR® made by Cabot Safety Corporation of Indianapolis, Ind. The grommet has a generally tube shape with its ends having increased sized like a dumbbell The inner diameter of the grommet is sized to accommodate the fastening means 42 while the outer diameter of the grommet at the center is sized for a fight fit in the holes 94 of the speaker 34. The present invention provides a plurality of second isolation means 38 with one at each corner of the mounting flange of the speaker 34. Such a mounting configuration advantageously reduces the transmission of the vibrations caused by sound being produced by the speaker 34 from being transferred to the cover 32. In the preferred embodiment, the fastening means 42 is a plurality of shoulder screws, although those skilled in the are will realizes that the fastening means 42 may take various other forms. The use of shoulder screws (i.e., screws that are preloaded to a specific pressure and can only be screwed in so far before stopping or locking) ensures the proper compression of the second isolation means 38. The speaker 34 has second isolation means 38 positioned within each hole 94 such that each end of the second isolation means 38 protrudes outside the hole 94 to cover an area about the hole 94. The speaker 34 is mounted to the cover 32 by inserting the fastening means 42 through the second isolation means 38 and into the hole 92 on the cover 32. Thus, there is advantageously no direct contact between the speaker 34 and the cover 32 or the fastening means 42. Fastening means 42 and the cover 32 are in direct contact but both are isolated from the speaker 34 by the grommet 38 which reduces the amount of vibration of the speaker 34 that is passed to the cover 32. The present invention also provides a sealing gasket 44, preferably made of foam, that is positioned between the speaker 34 and cover 32. The sealing gasket 44 preferably has a ring like shape sized to fit about the mid-portion of the speaker 34. The sealing gasket 44 is provided to ensure that a tight seal is formed between the speakers 34, 36 and the cover 32. This allows sealing of the speaker 34, 36 to its enclosure for improved acoustical performance while maintaining the effectiveness of the second isolation means 38. The positioning of the second isolation means 38 and the sealing gasket 44 when the speaker 34 is mounted can best be seen in FIG. 10. FIG. 10 is a cross-sectional view of the speaker 34 and cover 32 taken along line 10—10 of FIG. 4. As shown in FIG. 10, the gasket 44 is positioned about the periphery of the opening 90 such that the rear portion of the speaker 34 is separated from the front portion of the speaker 34 which yields improved audio performance. The use of foam material for the gasket 44 is also advantageous because any vibrations transmitted by sealing the interior of the audio unit 14 from the exterior of the audio unit 14 are minimized. Again, FIG. 10 also show that there is no direct contact between the fastening means 42 and the speaker 34 because they are separated by one end of the second isolation means 38, and that there is no direct contact between the cover 32 and the speaker 34 because they are separated by the other end of the second isolation means 38.

Referring back to FIG. 3, the attachment of the first isolation means 40 to the cover 32 is also shown in more detail. As has been noted above, the plurality of first isolation means 40 are mounted on top of the cover 32 along the sides of the channel 88. There are preferably four first isolation means 40, two positioned on opposite sides of the channel 88 proximate the front 68 of the cover 32 and two positioned on opposite sides of the channel 88 proximate rear of the cover 32. The cover 32 defines two holes 96 proximate the front 68 each for receiving the first isolation means 40. The holes 96 preferably have a diameter sized to accommodate a middle section 112 of the first isolation means 40 as will be described in more detail below with reference to FIGS. 5 and 11. The cover 32 also defines two additional holes 98 proximate the end of the channel 88. These holes 98 have a similar shape and size to holes 96, however, these holes 98 are constructed on a protrusion or foot defined on the top of the cover 32. Because of there positioning, they are slightly elevated with respect to the other holes 96. Moreover, it should also be noted that the longitudinal axis of the first isolation means 40 is perpendicular to the longitudinal axis of the second isolation means 38. Such a perpendicular arrangement of the first and second isolation means 38, 40 is particularly advantageous because it reduces the transmission of vibrations because changes in transmission direction in vibrating structures induce further losses of amplitude in the transmitted waves.

Also shown in FIG. 3 is the tray member 30. The tray member 30 has a generally rectangular box shape near the rear. Proximate the middle of the member 30, it curves outward to define chamber areas behind each speaker 34, 36. A front edge 58 of the tray member 30 has an arcutate shape. From a top plan view, the shape of the display unit 12 and the audio unit 14 can be seen as similar. The front, rear and sides of the cover 32 also have similar shapes to corresponding portions of the tray member 30. The tray member 30 defines a slot 48 along its longitudinal axis. The slot 48 is sized and shaped to receive a mating member and tilt ball of the base 16 such that movement of the member of the base 16 in the slot 48 provides for pivoting and rotation of the audio unit 14 with respect to the base 16. About the slot 48 is a protrusion 100 that helps to seal the chamber formed between the tray member 30 and the cover 32. The protrusion 100 mates with a groove on the bottom of the cover 32 to form an effective audio seal as will be described in more detail below with reference to FIGS. 4, 8 and 9. The tray member 30 also has a plurality of support columns 46 (not shown in FIG. 3) spaced apart about the top of the tray member 30. The support columns 46 are to support the cover 32 when mounted on the tray member 30. In one embodiment, the positioning of the support columns matches holes defined in the cover 32, and the support columns 46 have apertures for receiving a fastening means 130 to secure the cover 32 and the tray member 30 together (See FIG. 11). The tray member 30 also includes a left wall 52, a right wall 54, and a rear wall 56. The left wall 52 and the right wall 54 extend along the full length of the tray member 30 and follow the shape of the tray member 30 as has been described above. On the interior of the left and right walls 52, 54 a step 62, 60 respectively, is formed for supporting the edges 64, 66 of the cover 32. Finally, the tray member 30 provides an additional series of protrusions 102 and 104 for sealing the area between the tray member 30 and the cover 32. The first protrusion 102 is located along the front edge 58 of the tray member 30, and extends from the right wall 52 to the left wall 54. The second protrusion 104 also extends from the right wall 52 to the left wall 54, but is positioned between the middle of the tray member 30 and the rear wall 56. In the area between the middle of the tray member 30 and the second protrusion 104, the thickness of the tray member 30 increases such that the second protrusion 104 mates with a corresponding groove on the bottom of the cover 32 even though the rear of the cover does not extend downward like the front 68.

Figure 4:
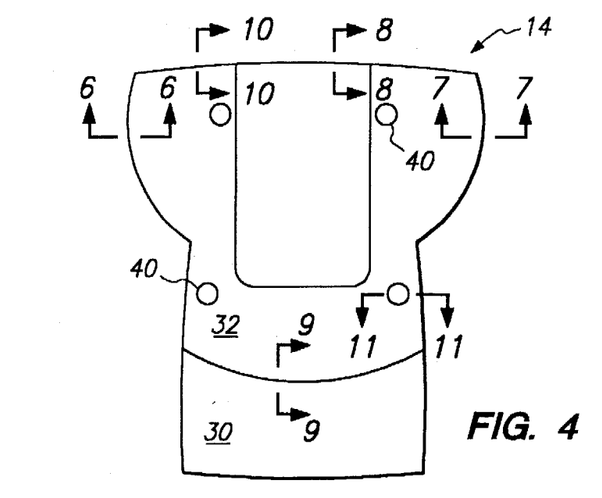
FIG. 4 is a top view of the preferred embodiment of the audio unit of the present invention.
Figure 6:
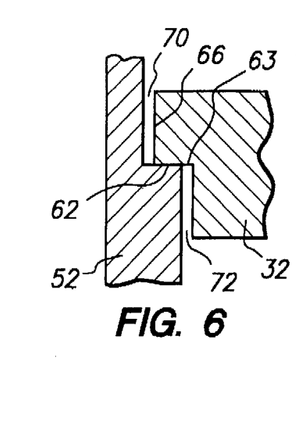
FIG. 6 is a partial cross-sectional view of the left side of the audio unit taken along line 6—6 of FIG. 4.
Figure 7:
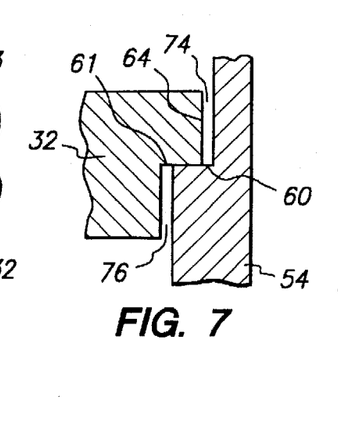
FIG. 7 is a partial cross-sectional view of the right side of the audio unit taken along line 7—7 of FIG. 4.

Referring now to FIGS. 4 and 6–9, the novel joints utilized by the present invention to form an audio chamber with improved performance between the cover 32 and the tray member 30 will be described in more detail. FIG. 4 shows a top plan view of the audio unit 14, and more particularly, the areas that will be shown in cross-section to illustrate how the audio chamber between the cover 32 and the tray member 30 is sealed. Referring now to FIG. 6, the seal formed along the right side of the cover 32 and the tray member 30 is shown in more detail. The cover 32 and the tray member 30 are preferably joined by lap jolts along the sides. As has been noted above, a step 62 is formed along the interior of the right wall 52 of tray member 30. The right edge 66 of the cover 32 has a corresponding and mating step 63. When the cover 32 is positioned on the tray member 30, the steps 62, 63 should be in contact with one another. Moreover, the cover 32 is sized for a tight fit along the right edge 66 with the wall 52 of the tray member 30. Thus, a seal is formed because the mating steps 63 and 62 are in contact with one another. Even if the mating steps 63 and 62 are not in contact with one another, an effective seal continues to exist because the exterior channel 70 and an interior channel 72 formed between the wall 52 and the edge 66 are very narrow, and therefore, provide high impedance to any air being forced into and out of the audio chamber formed between the cover 32 and tray member 30. Similarly, as shown in FIG. 7, the step 60 along the interior edge of the left wall 54 mates with a corresponding step 61 on the left edge 64 of the cover 32. Again, if the steps 60, 61 are not in contact to form an actual seal, the narrow upper and lower channels 74, 76 between the cover 32 and the tray member 30 impede the flow of air inward and outward to the point where the chamber is effectively sealed. In a similar manner, the vertical edges of the front wall 68 and rear wall of the cover 32 define steps that mate with corresponding steps on the vertical edges of the interior of the tray member 32 to completely seal the audio chamber.

Figure 8:
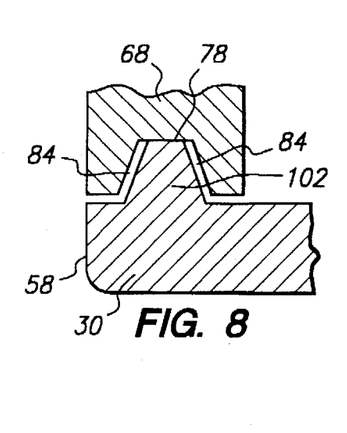
FIG. 8 is a partial cross-sectional view of the front wall of the audio unit taken along line 8—8 of FIG. 4.
Figure 9:
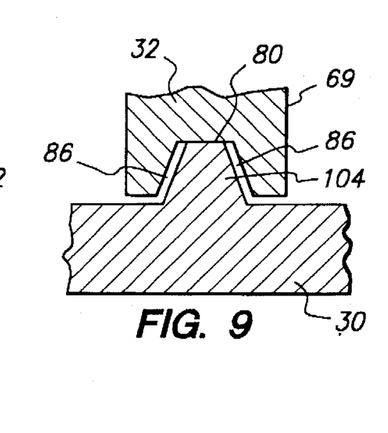
FIG. 9 is a partial cross-sectional view of a portion of the audio unit proximate the rear of the audio unit taken along line 9—9 of FIG. 4.

Referring now to FIG. 8, a cross-sectional view taken near the front of the audio unit 14 along line 8—8 of FIG. 4, illustrates how the front of the chamber is sealed. The front and rear of the cover 32 and the tray member 30 are preferably joined by a labyrinth joint. Proximate the front edge 58 of the tray member 30 there is a protrusion 102 that extends from the left wall 54 to the right wall 52. On the bottom of the front wall 68 of the cover 32, a corresponding cavity 78 is defined that extends from the left edge 64 of the cover 32 to the right edge 66 of the cover 32. The protrusion 102 is sized and shaped (trapezoidal) to fit into and make contact with the cover 32 inside the cavity 78. Again, in most cases a seal will be formed due to the contact between the tray member 30 and the cover 32, in a tongue and groove manner. However, even if the tray member 30 and the cover 32 are not in contact, the restriction on the flow of air between the interior of the chamber and the exterior of the chamber due to the L-shaped channels 84 on either side of the protrusion 102 effectively seal off the chamber. Similarly, there is a protrusion 104 that extends from the left wall 54 to the right wall 52 at a position intermediate the rear wall 56 and the middle of the tray member 30. As best shown in FIG. 9, on the bottom near the rear 69 of the cover 32, a corresponding groove 80 is defined that extends from the left edge 64 of the cover 32 to the right edge 66 of the cover 32. The protrusion 104 is adapted in size and shape for the groove 80, and extends into and makes contact with the cover 32 inside the groove 80 to seal the rear portion of the chamber. Even if there is not contact between the tray member 30 and the cover 32 in the groove 80 as designed, the narrow channels 86 on both sides of the protrusion 104 will restrict the flow of air between the interior of the chamber and the exterior of the chamber form an effective seal. The cover 32 also defines a corresponding oval groove (not shown) proximate the slot 48 to mate with the protrusion 100 in a similar tongue and groove fashion.

Figure 5:
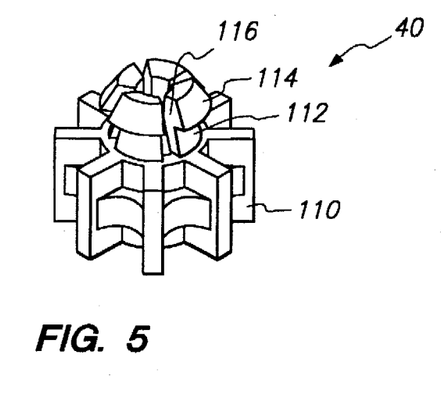
FIG. 5 is a bottom perspective view of a preferred embodiment of a first isolation means of the present invention.

Referring now to FIG. 5, a bottom perspective view of the first isolation means 40 is shown. The first isolation means 40 is preferably a generally star shaped tube as shown in FIG. 5. The first isolation means 40 is hollowed along its longitudinal axis. The hollow along the longitudinal axis is generally cylindrical and sized to accommodate a locking screw 82 with a head 132 as will be described below with reference to FIGS. 11 and 12. The first isolation means 40 has an upper portion 110, a middle portion 112 and a lower portion 114. The upper portion 110 has a generally cylindrical tube shaped part and provides a plurality of support partitions that extend radially outward from the tube shaped part. The support partitions are given added strength by webbing between each partition. Formed as an integral part of the first isolation means 40, is the middle portion 112. The middle portion 112 connects the upper portion 110 and lower portion 114. The middle portion 112 also has a generally tube shape with the same inner diameter as that of the upper portion 110. However, the outer diameter of the middle portion 112 is preferably less than the outer diameter of the tube shaped part of the upper portion 110. The outer diameter of the middle portion 112 is also sized for a close fit with the holes 96, 98 of the cover 32. The bottom portion 114 has a generally tube shape with the same inner diameter as the upper portion 110. The outer diameter of the bottom portion 114 is greater than that of the middle portion 112 proximate the end attached to the middle portion 112. The outer diameter of the bottom portion 114 tapers to a smaller outer diameter near the end distal the middle portion 112. The middle portion 112 and bottom portion 114 have a plurality of slits 116 that are cut in parallel with the longitudinal axis and extend from the bottom of the first isolation means 40 to the upper portion 110. The slits 116 advantageously allow the middle portion 112 and bottom portion 114 to be forced inward to allow insertion of the first isolation means 40 into the holes 96, 98 of the cover 32. In the preferred embodiment, the first isolation means 40 is constructed of elastomeric material with very good vibration absorbing characteristics such as EAR® like the second isolation means 38.

Figure 11:
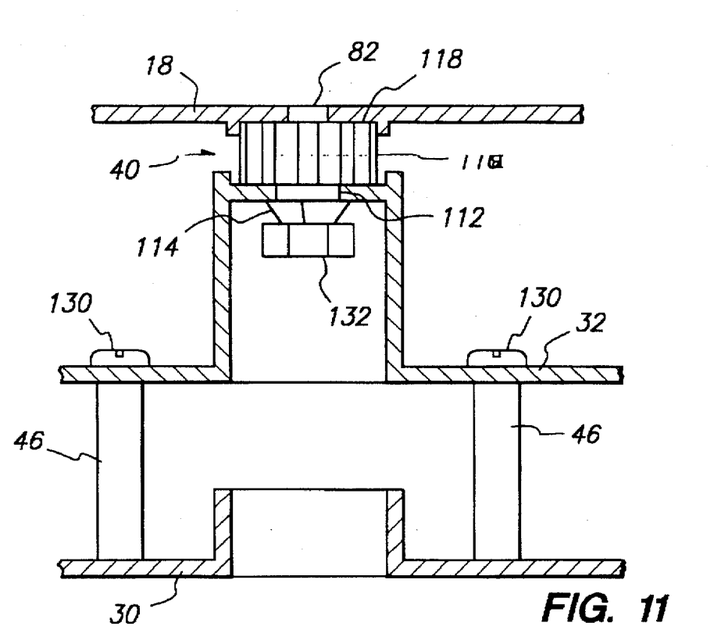
FIG. 11 is a partial cross-sectional view of a portion of the audio unit proximate the support columns and taken along line 11—11 of FIG. 4.
Figure 12:
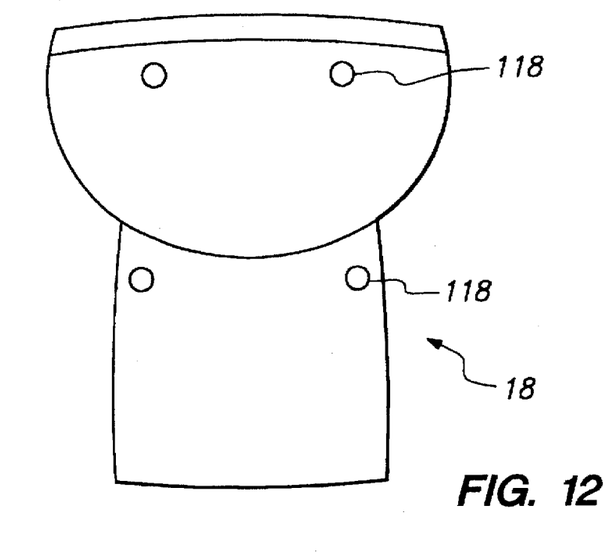
FIG. 12 is a bottom view of a housing of the display unit that is mounted on the top of the audio unit.

Referring now to FIGS. 11 and 12, the coupling of the display unit 12 and the audio unit 12 with the first isolation means 40 will be described in more detail. FIG. 11 illustrates a cross-sectional view of the first isolation means 40, cover 32, tray member 30, and display unit 12 as taken along line 11—11 of FIG. 4. As illustrated, the cover 32 is attached to the tray member 30 by the support columns 46 that receive screws (not shown) that secure the cover 32 on the tray member 30. The first isolation means 40 is mounted in the hole 96 of the cover 32. As can be seen from the cross-sectional view, the outer diameter of the middle portion 112 of the first isolation means 40 provides a close fit in the hole 96. The upper and lower portions 110, 114 have outer diameters that are greater than the hole 96, thereby preventing the first isolation means 40 from being pulled upward or downward out of the hole 96. The locking screw 82 is positioned within the longitudinal cavity through the first isolation means 40. The head 130 of the locking screw 82 is positioned below the lower portion 114 and the screw 82 extends upward through the cavity until it engages the bottom of the monitor housing 18. Thus, once the locking screw 82 is in place, the middle and lower portions 112, 114 are forced outward, and prevented them from collapsing inward, to secure the first isolation means 40 in the hole 96 of the cover 32. The end of the upper portion 110 distal the middle portion 112 provides an area upon which the housing 18 can be mounted to the audio unit 14 while remaining isolated from vibration. The housing 18 preferably provides a plurality of depressions 118 that are sized and shaped to receive the locking screw 82 and the end of the upper portion 110 distal the middle portion 112. As best shown by FIG. 12, the depressions 118 have a shape such that the support partitions of the upper portion 110 mate with cavities of the depressions 118. As best seen by a comparison of FIGS. 4 and 12, the depressions 118 are positioned on the bottom of the housing 18 to correspond to the positions of the four isolation means 40 of FIG. 4.

Figure 13:
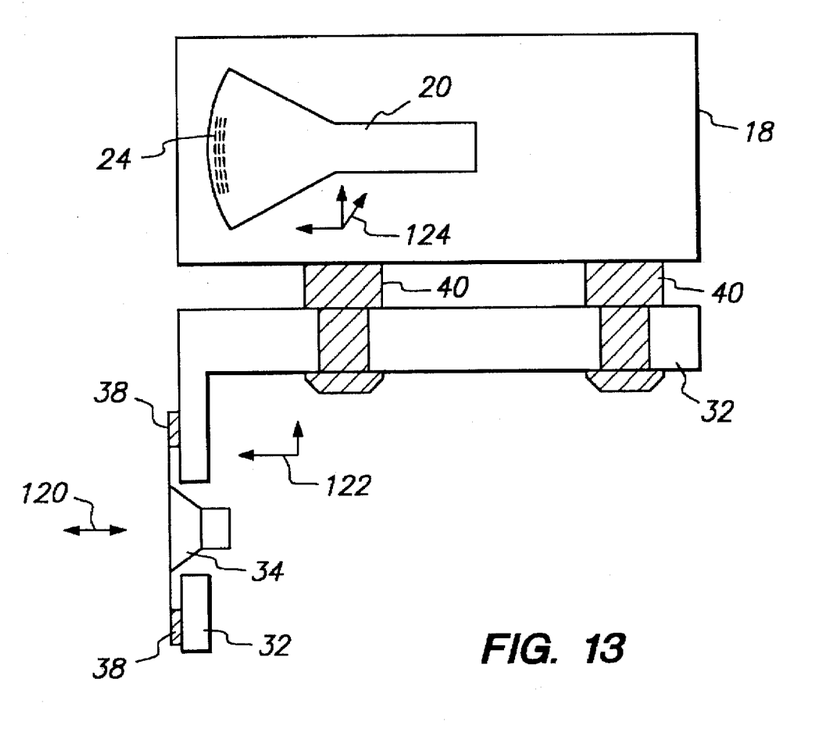
FIG. 13 is a schematic diagram showing the path for the transfer of sound energy from the speakers to the CRT.

Finally, FIG. 13 shows the audio unit 14 and the display unit 12 schematically to illustrate the path which vibrations produced by use of the speakers 34, 36 must follow to affect the mask or vertical wires 24 of the CRT 20. In order to produce sound, the cones of speakers move horizontally as represented by arrow 120. The movement of the speakers 34, 36 in turn produces vibrations for objects attached to the speakers 34, 36. However, since the speakers 34, 36 are attached to the cover 32 by the second isolation means 38 much of the vibration energy from the speakers 34, 36 is dampened out. The remaining vibration energy passes through the cover 32 to the first isolation means 40. The first isolation means 40 is advantageously mounted at a right angle with respect to the direction of the energy (e.g., arrow 120), thus making it very difficult for the energy to be transferred to the monitor housing 18. In particular, the vibration energy must travel through the right angle path as illustrated by arrow 122. The first isolation means 40 is also mounted at a right angle with respect to the direction which the vibration energy must be transmitted to affect the vertical wires 24. In order for the vibration energy to cause the vertical wires 24 to vibrate and negatively affect the display output, the energy must be passed in an orthogonal direction between the isolation means 40 and the housing 18 as shown by arrow 124. Again, it is more difficult for the energy to travel at right angles and less vibration energy will be passed. Therefore, the orthogonal configuration of the present invention is particularly advantageous because vibration energy must make a plurality of right angle directional changes to be passed from the speakers 34, 36 to the CRT 20. It should also be noted that the right angle coupling are also used in conjunction with dampening media, namely the first and second isolation means 40, 38, for increased effectiveness.

As the vibrations pass through the cover 32, they may be amplified, thus, the first isolation means 40 provides a second stage of isolation to further reduce and dampen the vibration energy that is passed on to the monitor housing 18. The monitor housing 18 advantageously rests on the first isolation means 40 to utilize the mass of the display unit 12 to create a low tuned frequency system. In other words, mass of the display unit 12 combined with the first isolation means 40 act effectively as a low pass filter to prevent vibrations in the 300–400 Hz range from being transferred to the monitor housing 18 and thus to the vertical wires 24. This particularly significant since it is vibrations in the 300–400 Hz range that are most likely to excite the vertical wires 24 and cause video output problems. FIG. 13 also illustrates how the cover 32, which may potentially amplify the vibrations caused by the speakers 34, 36, is effectively isolated. The cover 32 is isolated by being sandwiched between the two stages of isolation means 38, 40.

While the present invention has been described with reference to certain preferred embodiments, those skilled in the art will recognize that various modifications may be provided. These and other variations upon and modifications to the preferred embodiment are provided for by the present invention which is limited only by the following claims.

What is claimed is:

1. An integrated audio and visual output system comprising:

a display device within a housing having a bottom;

an audio unit having a top and a front, the front defining an opening;

a first isolation means that absorbs vibrations, the first isolation means positioned between the top of the audio unit and the bottom of the housing, and connected to at least one adaptation in the top of the audio unit and to at least one adaptation in the bottom of the housing, for securing the audio unit to the housing while preventing vibration transfer into the display device; and a speaker positioned in the opening of the audio unit, the speaker being mounted to the audio unit by a second isolation means that absorbs vibrations.

2. The system of claim 1, wherein the first isolation means is mounted orthogonally with respect to the second isolation means so that vibrational motion from the speakers must make at least two right angle turns before reaching the housing.

3. The system of claim 1, wherein the first isolation means is a plurality of grommets that are positioned spaced apart on the top of the audio unit, and wherein the bottom of the housing defines a plurality of cavities, each of the cavities receiving and holding a respective grommet.

4. The system of claim 1, wherein the first isolation means is constructed of elastomeric material with good vibration absorbing characteristics.

5. The system of claim 1, wherein:

the first isolation means is directly attached to the display unit and the first isolation means is directly attached to the audio unit;

the display unit and audio unit do not contact each other; and the display unit is positioned above the audio unit and secured thereto by the mass of the display unit upon the first isolation means.

6. The system of claim 1 wherein the first isolation means is constructed of elastomeric material with good vibration absorbing characteristics such that the mass of the display unit and the first isolation means act effectively as a low pass filter to prevent transfer of vibrations in the 200 to 500 Hz range.

7. The system of claim 1, wherein the first isolation means comprises:

an upper portion with a generally cylindrical tube shaped and a plurality of support partitions that extend radially outward, the support partitions being reinforced by webbing located between the partitions;

a middle portion with generally cylindrical tube shape and having an outer diameter less than that of the upper portion; and a lower portion with a silted generally cylindrical tube shape and having outer diameter greater than the middle portion.

8. The system of claim 7, wherein the first isolation means defines a hollow along its longitudinal axis and includes a locking screw that is positioned in the hollow to force the middle and lower portions outward thereby securing the first isolation means to the audio unit.

9. The system of claim 1, wherein the audio unit comprises:

a cover having a generally planar shape, the cover having a front wall that forms the front of the audio unit and a rear wall;

a tray member having a generally rectangular box shape that curves outward to define chamber areas; and wherein the cover and the tray member mate together to form an audio chamber there between when the cover is mounted on the tray member.

10. The system of claim 9, wherein the cover and the tray member are sealed together to form an audio chamber there between by a combination of lap joints and labyrinth joints.

11. The system of claim 9, wherein:

the cover has a left side and right side that each define a step;

the tray member has a left wall and right wall and an interior side of the left and right walls each define a step; and the step on the left side of the cover rests upon the step on the interior of the left wall of the tray member and the step on the right side of the cover rests upon the step on the interior of the right wall of the tray member to seal the audio chamber formed between the cover and tray member.

12. The system of claim 9, wherein:

a bottom side of the front wall of the cover defines a trapezoidal cavity that extends across a width of the cover;

a bottom side of the rear wall of the cover defines a trapezoidal groove that extends across the width of the cover;

the tray member includes a first protrusion along a front edge of the tray member and a second protrusion proximate the rear of the tray member and extending from a left wall to right wall of the tray member; and the first protrusion is positioned in the cavity and the second protrusion is positioned in the groove to seal the audio chamber formed between the cover and tray member when the cover is mounted on the tray member.

13. The system of claim 9, wherein the cover include vertical walls that define a channel for increasing the structural integrity of the cover and providing additional control of resonances so that the vibrations from are not amplified.

14. The system of claim 1, wherein the second isolation means is a plurality of grommets that are position about the periphery of the speaker, and wherein the speaker defines a plurality of holes, each of the holes receiving and holding a respective grommet.

15. The system of claim 14, wherein the second isolation means includes a plurality of fastening means corresponding in number to the plurality of grommets and a gasket for forming a seal between the speaker and the front of the audio unit; and wherein each of the plurality of grommets define a hole in which a corresponding one of the fastening means is positioned to eliminate contact between the speaker and the fastening means, and between the speaker and the front of the audio unit.

16. The system of claim 14, wherein the second isolation means is constructed of elastomeric material with good vibration absorbing characteristics.

17. The system of claim 14, wherein each of the grommets has a generally tube shape with its ends increased in size like a dumbbell.

18. The system of claim 1, wherein the front of the audio unit defines a second opening and wherein the system further comprises a second speaker mounted in the second opening of the audio unit, the second speaker being mounted to the audio unit by a third isolation means that absorbs vibrations.

* * * * *

UNITED STATES PATENT AND TRADEMARK OFFICE
CERTIFICATE OF CORRECTION

PATENT NO. : 5,689,574

DATED : November 18, 1997

INVENTOR(S) : Heirich, et al.

It is certified that error appears in the above-identified patent and that said Letters Patent is hereby corrected as shown below:

In the claims:

Claim 1, Column 10, line 4, please insert after "housing" - -for securing the audio unit to the housing- -.

Signed and Sealed this

Twenty-ninth Day of June, 1999

Attest:

Attesting Officer

Q. TODD DICKINSON

Acting Commissioner of Patents and Trademarks